United States Patent [19]

Tarumi et al.

[11] 4,373,076
[45] Feb. 8, 1983

[54] TERPOLYMER WITH A HIGH REFRACTIVE INDEX

[75] Inventors: Niro Tarumi, Akishima; Mitsuo Sugimura, Fussa; Shigeo Komiya, Akishima; Makoto Tsuchiya, Tokyo, all of Japan

[73] Assignee: Hoya Lens Corporation, Tokyo, Japan

[21] Appl. No.: 315,127

[22] Filed: Oct. 26, 1981

[51] Int. Cl.$^3$ ............................................ C08F 26/06
[52] U.S. Cl. .............................. 526/261; 204/159.23; 428/442
[58] Field of Search .................... 526/261; 204/159.23

[56] References Cited
U.S. PATENT DOCUMENTS 3,228,915  1/1966  Sauer et al. .................... 526/261

Primary Examiner—Harry Wong, Jr.
Attorney, Agent, or Firm—Sprung, Horn, Kramer & Woods

[57] ABSTRACT

A high refractive lens of a terpolymer produced by the polymerization of ternary monomers comprising diethylene glycol bisallyl carbonate, triallylisocyanurate, and benzyl methacrylate. This lens is considerably improved in its physical properties necessary for lens such as superficial hardness, transmittance, and adhesion strength of glass film coated on the surface, as well as having a high refractive index.

1 Claim, No Drawings

TERPOLYMER WITH A HIGH REFRACTIVE INDEX

BACKGROUND OF THE INVENTION

1. Field of the Invention

This invention relates to a terpolymer with a high refractive index and the plastic lenses made of the terpolymer.

2. Description of the Prior Art

Recently lenses of organic glass have been widely used instead of lenses of inorganic glass, because organic glass is superior to inorganic glass in its lightness, safety due to its high impact resistance, workability, dyeability, etc. For example, lenses made of diethylene glycol bisallyl carbonate (hereinafter referred to CR39) have already been used widely. But, lenses of CR39 have such a disadvantage that the lenses must be thicker than those of inorganic glass, because of their relatively low refractive index such as 1.499. There is known a method for overcoming the disadvantage comprising copolymerizing CR39 with benzyl methacrylate so as to increase the refractive index. However, lenses obtained by the copolymerization are inferior to lenses of CR39 in their superficial hardness, so that the lenses must be more carefully handled.

We have now found that copolymerization of ternary monomers consisting of CR39, benzyl methacrylate, and triallylisocyanurate enables to produce lens with a high refractive index and a high superficial hardness.

An object of this invention is to provide a plastic lens with a high refractive index and a high superficial hardness.

SUMMARY OF THE INVENTION

This invention relates to a terpolymer produced by the polymerization of ternary monomers comprising diethylene glycol bisallyl carbonate, triallylisocyanurate and benzyl methacrylate.

DETAILED DESCRIPTION OF THE PREFERRED EMBODIMENTS

In this invention, CR39 is preferably used in the range of 40 wt.% to 80 wt.%. Benzyl methacrylate is preferably used in the range of 10 wt.% to 30 wt.%. Triallylisocyanurate is preferably used in the range of 10 wt.% to 30 wt.%. And, it is preferable that the amount of benzylmethacrylate is not larger than that of triallylisocyanurate. The more the amount of benzylmethacrylate than that of triallylisocyanurate, the lower the transparency of the lens produced therefrom. On the contrary, when the amount of triallylisocyanurate is extremely larger than that of benzyl methacrylate, the lens thereof is liable to be easily cracked.

The lens of this invention can be prepared by pouring the mixed solution consisting of CR39, benzyl methacrylate, triallylisocyanurate, and initiator into a mold made of two plates of glass mold and a plastic gasket, and then curing the resulting one by means of heating it or irradiating it with ultraviolet ray.

The high refractive lens of this invention is more improved than the lens obtained by copolymerizing CR39 with a methacrylate such as benzyl methacrylate in its superficial hardness, transmittance, and adhesion of coating material. Namely, the lens of this invention is the one whose refractive index and superficial hardness are increased with keeping the same excellent physical properties as are inherent in the lens of CR39. Such remarkable effect seems to have never been performed in the copolymer of binary monomers.

This invention will be more clearly understood with reference to the following Examples.

EXAMPLE 1

A mixed solution consisting of 60 wt. parts of CR39, 20 wt. parts of benzylmethacrylate, 20 wt. parts of triallylisocyanurate, and 5 wt. parts of diisopropylperoxydicarbonate was poured into a mold made of two plates of glass mold and a plastic gasket. The one was heated to elevate the temperature from 40° C. to 90° C. in 24 hours. After curing, the lens was taken out of the mold, and heat-treated at 120° C. for one hour. The lens obtained possessed 1.523 of refractive index, 92% of transmittance (550 nm), 3H of pencil hardness, and an impact resistance which passed inspection of FDA Standard. Adhesion of a glass film coated on the lens surface by vacuum evaporation method stood the cross cut test and alkali-resisting test.

In example 2 and 3, and comparative example 1-5, lenses were prepared in the same manner as in Example 1, except that the monomer composition in Table 1 were used. Table 1 shows the result.

TABLE 1

|  | Composition of monomers (%) | | | Properties of lens | | | |
|---|---|---|---|---|---|---|---|
|  | CR39 | BzMA | TAIC | transmittance (%) | Ref. Ind. | Pencil Hardness | coating property |
| Comp. Ex. 1 | 100 | 0 | 0 | 92 | 1.499 | H-2H | ○ |
| Comp. Ex. 2 | 70 | 30 | 0 | 91 | 1.519 | F | Δ |
| Comp. Ex. 3 | 70 | 0 | 30 | no lens is formed because of crack | | | |
| Comp. Ex. 4 | 50 | 40 | 10 | 90 | 1.533 | F | Δ |
| Comp. Ex. 5 | 50 | 10 | 40 | no lens is formed because of crack | | | |
| Example 1 | 60 | 20 | 20 | 92 | 1.523 | 3H | ○ |
| Example 2 | 80 | 10 | 10 | 92 | 1.511 | 2H | ○ |
| Example 3 | 40 | 30 | 30 | 91 | 1.536 | 4H | ○ |

CR39: diethylene glycol bisallyl carbonate
BzMA: benzyl methacrylate
TAIC: triallylisocyanurate
transmittance (%): measured at 550 nm
pencil hardness: based on Japanese Industrial Standard
coating property: showed by the result of cross cut test and alkali-resisting test carried on the glass film coated by vacuum evaporation method.
symbol ○ : the film strength is larger than that of CR39
symbol Δ: the film strength is weaker than that of CR39
symbol X: the film can not be adhered

What is claimed is:

1. A high refractive lens formed of a terpolymer produced by polymerizing a mixture comprising by weight 40 to 80% of diethylene glycol bisallyl carbonate, 10 to 30% of triallylisocyanurate and 10 to 30% of benzyl methacrylate.